Patented Apr. 24, 1951

2,549,842

UNITED STATES PATENT OFFICE 2,549,842

METHOD FOR PRODUCING POLYHALO-PHTHALOCYANINE PIGMENTS

Frank H. Moser, Huntington, W. Va., assignor to The Standard Ultramarine Company, Huntington, W. Va., a corporation of West Virginia No Drawing. Application April 9, 1948,
Serial No. 20,096

18 Claims. (Cl. 106—288)

The present invention relates to coloring matters of the phthalocyanine series and to a process for the production thereof. More particularly, the present invention relates to polyhalophthalocyanine coloring matters and to a process for the production thereof from polyhalogenated phthalocyanine-forming initial materials.

Polyhalophthalocyanines containing in excess of eight atoms of halogen per molecule are known as "phthalocyanine greens" because of their characteristic bluish-green to bright green shades attributable to the halogen content in the molecule. As the substitution of hydrogen by halogen in the nuclei of the benzene rings of the molecule is continued, the shade of the product becomes progressively greener. This progression is not uniform, however, but a stage is reached when the tendency to become distinctly green is pronounced, which occurs when the number of halogen atoms in the phthalocyanine molecule is equal to about eight. Again when over thirteen halogen atoms have been introduced into the molecule, an abrupt increase in the greenness of the color results.

Various polyhalogenated phthalocyanines containing from eight to the limit of sixteen halogen atoms per molecule are known. However, the production of halogenated phthalocyanines containing in excess of eight halogen atoms per molecule has previously been limited to methods of synthesizing a phthalocyanine compound from non-halogenated initial material, with subsequent halogenation of the resulting pigment.

A number of methods of halogenating the previously formed phthalocyanine compounds to obtain polyhalogenated phthalocyanines have been employed, for example, those processes described in United States Patents Nos. 2,214,469, 2,247,752, 2,253,560, 2,276,860 and 2,377,685. In all such halogenation processes highly corrosive halogenating agents, such as chlorine and bromine in gaseous or liquid form, must be employed. Special corrosion-resistant apparatus must be used, and the reaction must be conducted in closed or sealed vessels.

Furthermore, in such methods rigid control of factors, such as temperature and the like, must be practiced in order to avoid destruction of the phthalocyanine molecule, for example, by withdrawal of the metal content thereof, and/or ultimate rupture of the rings containing the nitrogen atoms extracyclic to the isoindole units, to form decomposition products of phthalocyanine with consequent decrease in the yield.

One of the main disadvantages of the prior art methods for the synthesis of polyhalogenated phthalocyanines is the lack of accurate or automatic control of the degree and/or uniformity of halogenation. The degree of halogenation is purely arbitrary, and can only be controlled by analysis of test samples removed during the reaction in order to determine when the desired degree of halogenation is attained. Moreover, the halogen-containing phthalocyanines resulting from halogenation of previously prepared phthalocyanines are not symmetrically or uniformly substituted by halogen atoms except in the case where the molecule is fully saturated with halogen, namely where the molecule contains sixteen halogen atoms. The substitution of halogen for hydrogen occurs practically at random in the molecule being governed only to a certain extent by the directing influence of halogen atoms previously substituted.

The desirability of a method of synthesizing polyhalophthalocyanines from polyhalogenated phthalic acid or its derivatives has long been recognized. However, in both the scientific and patent literature, there is abundant recognition of the fact that no feasible method exists for the synthesis of polyhalophthalocyanines containing more than eight halogen atoms, and particularly, at least twelve to the limit of sixteen halogen atoms per molecule from polyhalogenated phthalocyanine-forming initial materials, such as phthalic acid and derivatives thereof. For example, in United States Patent No. 2,377,685 on page 1, column 1, lines 16 to 21, inclusive, it is stated:

"In practice of the art heretofore the manufacture of halogenated metal phthalocyanines was effected by two principal processes: (1) Synthesis of a phthalocyanine compound from halogenated intermediates: (2) Synthesis of a phthalocyanine compound from non-halogenated initial material, isolating the color and then subjecting the same to halogenation in special media, for instance, nitrobenzene, molten phthalic anhydride or an aluminum-chloride-sodium chlorite melt.

"For the production of highly-halogenated phthalocyanine, say over fourteen halogen atoms per molecule, only the second mode of operation can be considered, inasmuch as the first mode is limited in applicability to the production at most of an octochloro-phthalocyanine."

It is, therefore, a primary object and purpose of the present invention to provide a new process for the manufacture of polyhalophthalocyanines containing in excess of eight halogen atoms per molecule from polyhalogenated phthalocyanine-forming initial material.

A further object of the invention is to provide a process for the production of symmetrically substituted highly halogenated phthalocyanines containing more than eight halogen atoms per molecule and in particular, those containing from twelve up to sixteen atoms of halogen per molecule.

Another object of the present invention is the preparation of valuable mixed pigments comprising polyhalophthalocyanines and metallic oxides, which pigments are formed in situ in the manufacture of the polyhalothalocyanines according to the process of the present invention.

It is a further object of the present invention to prepare highly halogenated phthalocyanines, particularly those containing at least twelve and up to and including sixteen halogen atoms per molecule in a high state of purity and in near theoretical yield by synthesis from the correspondingly highly halogenated intermediates.

Other objects and advantages of the present invention will become apparent from the following detailed description thereof.

The process of the present invention involves the so-called "urea method" of phthalocyanine synthesis. It has been discovered that by application of the "urea method" to phthalocyanine-forming initial materials, containing more than two halogen atoms per molecule, highly halogenated phthalocyanines, containing more than eight halogen atoms per molecule, may readily be prepared, provided the synthesis is effected in the presence of a halide and/or oxyhalide of the amphoteric metals selected from groups IV and V of the periodic table having atoms numbers within the range of from twenty to fifty-five, and in particular, zirconium, titanium, tin, antimony and arsenic.

The process of the present invention comprises heating together a substance selected from the group consisting of urea and biuret, or mixtures thereof, a metalliferous reagent capable of supplying the metal necessary for formation of metallic phthalocyanines, and phthalocyanine-forming initial materials, containing more than two nuclear substituted halogen atoms, the reaction being effected in the presence of an ancillary agent selected from the group consisting of halides and oxyhalides of zirconium, titanium, tin, arsenic, and antimony.

Phthalocyanine-forming initial material

The term "phthalocyanine-forming initial material," as used in this specification and in the appended claims, includes orthophthalic acid and all such derivatives and mixtures thereof as are suitable for use in the "urea method" of synthesizing phthalocyanine coloring matters, which acid, derivatives and mixtures contain an average of more than two halogen atoms attached to the benzene nucleus. Thus, this term includes tri and tetra-halophthalic acids and derivatives thereof, and mixtures of the tri and tetra-halogenated compounds; for example, the aforementioned phthalic acids, the mono and diammonium salts, thereof, the anhydrides, imides, mono and diamides, imimides, the orthocyanobenzamides; the lower monoalkyl esters, such as the methyl and ethyl esters; and other dehydration and deamidation products of the diammonium salts of such orthophthalic acids. The term does not include the dinitriles of such halogenated orthophthalic acids, which dinitriles are not employed in the "urea method" of phthalocyanine synthesis, since they contain all of the necessary nitrogen without any addition of urea.

The invention is particularly applicable to the synthesis of highly halogenated phthalocyanines containing twelve or more halogen atoms per molecule. The invention embraces the production of such compounds, as symmetrical decahalo-phthalocyanines and hexadeca-halophthalocyanines, as well as phthalocyanines containing an intermediate number of halogen atoms between twelve and sixteen per molecule by the use of mixtures of tri and tetrahalo-phthalocyanine-forming initial materials. The relative proportions of the tri and tetrahalogenated reactants will determine the halogen content of the product. Mixed halo-phthalocyanines may also be prepared by the use of mixtures of chlorinated and brominated phthalocyanine-forming initial materials. Polyhalophthalocyanines containing more than eight and up to twelve halogens per molecule may also be prepared by using mixtures of di and trihalogenated starting materials in selected proportions.

Throughout the specification and in the appended claims, the term "halogen" refers to the halogens, chlorine and bromine, only. The terms "halo" and "halogenated" are also to be construed in a correspondingly limited sense.

Metal supplying substance

The invention contemplates the preparation of stable metal polyhalophthalocyanines and in particular, copper, nickel, tin, chromium, cobalt, cadmium, antimony, molybdenum, lead, and other metallic polyhalophthalocyanines containing more than eight, and preferably twelve to sixteen halogen atoms per molecule. In order to synthesize these metal phthalocyanines, a metalliferous reagent, capable of supplying a metal under the conditions of the reaction, is employed. The reagent may exist in various forms, for example, as a finely divided metal, as an oxide, or as a salt.

The preferred metal is copper, since copper phthalocyanines find widest application in the pigment industry and related fields. Copper may be applied to the reaction in the elemental state, that is as a finely divided copper powder; in the oxide form, that is, cuprous and cupric oxide; and in the form of various salts, for example, cupric and cuprous chloride, cuprous cyanide, cupric sulfate, cupric nitrate trihydrate, and cupric phosphate trihydrate. When metallic salts are used, it is preferable to use the anhydrous form thereof, although the hydrated salts give satisfactory results. The foregoing exemplified forms of the metalliferous reagent are also illustrative of the forms in which the above-enumerated metals, other than copper, may be employed in the process.

It has been found that optimum results may be obtained in most instances by using the free metal in finely divided form in conjunction with an oxidizing agent.

When an oxidizing agent is employed, it is preferably used in the liquid or solid phase, that is, a non-gaseous oxidizing agent is more suitable for the reaction. Any one of a large number of both inorganic and organic oxidizing agents are suitable for the reaction involved. As an illustration of such oxidizing agents, there may be mentioned nitrates, perchlorates, persulfates, chlorates, bromates, permanganates as suitable salts; oxidizing acids, such as nitric acid; and organic oxidizers such as urea nitrate, nitro methane, and nitro benzene. The salts are preferably employed in the form of the ammonium and alkali metal salts.

The use of an oxidizing agent is not restricted to the case where a finely divided or powdered metal or metallic oxide is the metal-supplying reagent, but enhanced results are often obtained by the use of oxidizing agents when the metal-supplying agent is a salt. For example, cuprous salts in general give much better results when used with an oxidizing agent, and this is particularly true in the case of cuprous oxide and cuprous cyanide. On the other hand, the oxidizing agent may be completely dispensed with when the metal supplying agent is an oxide or a salt thereof and satisfactory results are obtained. Generally, the colors of the pigment are somewhat yellower and dirtier where the oxidizing agent is omitted, particularly where the free metals or the metals combined in their lower valence states are utilized.

It is to be understood from the foregoing that the metal-supplying agent may be the free metal, the oxides of the metal, or any of the salts thereof, the latter not being restricted to the foregoing illustrative examples. In this regard, however, it is to be noted that apparently the acetates and sulfides of the metals produce rather unsatisfactory results because they do not fully perform the function of supplying the metal under the conditions present during reaction.

The quantity of metal-supplying agent may vary over a wide range to produce colors of high pigmental value and outstanding permanence. It is, of course, preferred to use at least an amount of metal-supplying agent equivalent to the quantity of phthalocyanine-forming initial material reacted in order to produce near theoretical yields of the stable metal phthalocyanine. On this basis the mole ratio of metal-supplying agent to phthalocyanine-forming initial material is about one to four. However, the reaction proceeds satisfactorily with smaller amounts, as well as in the presence of large excesses of the metal-supplying agent.

When an oxidizing agent is utilized, widely varying quantities give entirely satisfactory results. In general, it is preferred to use a quantity of oxidizing agent sufficient to supply one mol equivalent of oxygen for each mol of metal-supplying agent present in the reaction mixture. However, large excesses of oxidizing agent, for example, a 100% excess, or two mol equivalents of oxygen per mol of metal-supplying agent may be used. Very large excesses of oxidizing agent have a tendency to cause the product to be somewhat dirty, and the use of such excesses does not serve in the interest of economy, although the yield of the product is not diminished to any extent. Thus, the quantity of oxidizing agent may vary from zero to a large excess over the amount equivalent to the quantity of metal-supplying reagent.

Nitrogen supplying substance

As the nitrogen-supplying substance for the process, there may be employed urea, biuret, and mixtures of these two substances. The quantity of urea, biuret, or mixtures thereof, may vary within extremely wide limits. It is highly convenient, if not necessary, in many instances to employ an excess of urea over the theoretical amount required.

In the synthesis of phthalocyanine by the urea process, all of the nitrogen content of the urea cannot be introduced into the phthalocyanine molecule, and consequently in order to produce a near theoretical yield based on the quantity of phthalocyanine-forming initial material, an excess of urea is required. It has been previously demonstrated that appreciable quantities of the urea and biuret are decomposed under the reaction conditions to form ammonia, some of which is evolved from the reaction mixture. This ammonia appears to be a by-product of the reaction and is not directly related to formation of the phthalocyanine pigment. Therefore, the reaction is usually conducted with an excess over the stoichiometrical equivalent of urea and biuret, namely one mol of urea or two-thirds of a mol of biuret per mol of phthalocyanine-forming initial material. For example, the amounts may vary from slightly over one mol of urea to five or more mols per mol of phthalocyanine-forming initial material. In those instances where nitrogen-containing derivatives of halogenated phthalic acid, such as the imides, the amides, and imimides are used as starting materials, it is permissible to use smaller quantities of urea or biuret, since these phthalic acid derivatives already contain a portion of the necessary nitrogen content for synthesis of the phthalocyanine.

The optimum range of urea is between three and seven mols per mol of polyhalophthalic acid or anhydride. Excess urea effectively acts as a flux for the reaction, and imparts to the reaction medium a suitable consistency for manipulation, and maintenance of homogeneity.

The ancillary reagent

Of critical importance to the successful synthesis of the polyhalophthalocyanine according to the process of the present invention is the particular ancillary reagent employed. It has been discovered that the halides or oxyhalides of amphoteric metals of the groups IV and V of the periodic system, according to Mendeleeff, having atomic numbers within the range of twenty to fifty-five when used in the "urea method" according to the present invention, result in the production of polyhalophthalocyanine containing more than eight and up to and including sixteen halogen atoms per molecule in near theoretical yield and of excellent pigmental quality. Among the ancillary reagents highly suitable may be mentioned the chlorides, bromides and oxychlorides of zirconium, titanium, tin, antimony and arsenic. The most effective of these has been found to be the zirconium and titanium compounds and these are therefore preferred.

The quantities of ancillary reagents used may vary widely. However, it has been found that best results in terms of high yields of the desired polyhalophthalocyanine and pigmental quality of the product are obtained when the ancillary reagent is used in the molecular ratio of at least one to four to the phthalocyanine-forming initial material, or about one to one to the phthalocyanine formed. The use of quantities appreciably less than the above molecular ratios are productive of rather unsatisfactory yield and the products are somewhat poor in quality.

In this regard, it is to be noted that the ancillary reagents of the present invention differ from those disclosed in the prior art, which are for the most part termed "catalysts." In all cases heretofore, such ancillary reagents are used in catalytic amounts. However, the amphoteric metal halides and oxyhalides constituting the ancillary reagents of this process must be employed in greater than catalytic quantities in order to obtain the desired results, namely phthalocyanine pigments containing more than eight halogen atoms per molecule and preferably at least twelve to sixteen halogen atoms. The quantity of ancillary reagents may vary from about four to fifteen percent or more by weight of the total quantity of the reacting materials, exclusive of any diluent or solvent which may be employed. In all such instances, and in the examples set forth below, the molecular ratio of ancillary reagents to phthalocyanine-forming initial material is at least one to four. In terms of the total reaction mass, the preferred amount is from about five to about ten percent by weight.

The explanation for the necessity of the use of appreciable quantities of the ancillary reagents over the amount which would be deemed "catalytic," appears to reside in the function thereof. Although it is not intended to limit the present invention to any particular theory of action, the ancillary reagents actually undergo chemical change during the reaction as opposed to the truly catalytic nature of the previously used ancillary agents. However, in no case do the amphoteric metals of the ancillary reagents of the present invention enter into the phthalocyanine molecule.

Various mechanisms have been proposed for the syntheses of phthalocyanines, including the so-called "urea method" of synthesis. However, no attempt is here made to postulate any definite mechanism regarding the formation of the phthalocyanine coloring matter of the present invention. The following equation merely suffices to indicate the general course of the reaction from the initial reactants, including the ancillary reagent, and the final products:

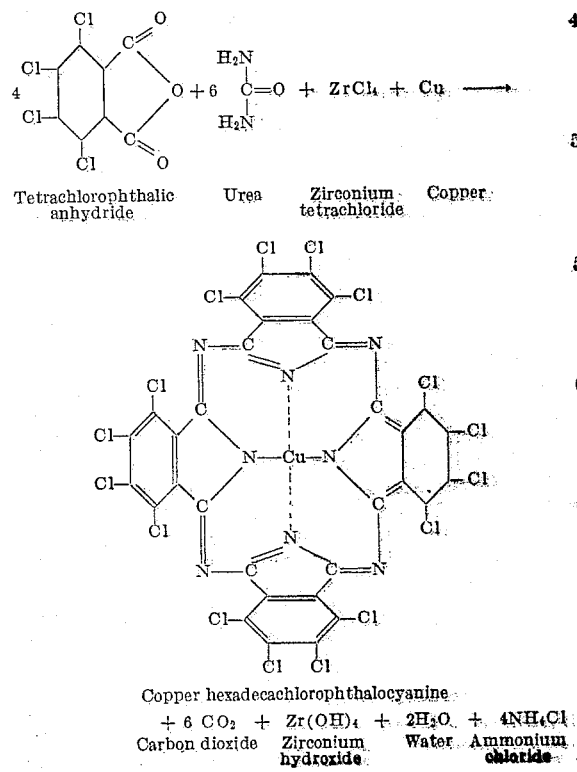

It is highly important to note according to the above equation that hydrated zirconium oxide, or the hydroxide of zirconium, is formed from zirconium tetrachloride when the latter is used as the ancillary reagent in the synthesis of copper hexadecachlorophthalocyanine from tetrachlorophthalic anhydride, urea and metallic copper. This formation of the hydrated oxide or hydroxide of the metal of the ancillary reagent occurs in all cases regardless of the particular metal employed, and regardless of whether the chloride, bromide or oxyhalide is employed. Thus, it may be seen that the function of the ancillary agent in the process of the present invention cannot be considered as catalytic. It suffices to state that only by reacting in the presence of the halides or oxyhalides of the named amphoteric metals can the polyhalophthalocyanines containing more than eight and particularly from twelve to sixteen halogen atoms be produced by the "urea method."

Reaction conditions

The reaction is preferably conducted in the presence of an inert organic diluent or solvent, since the use of a melt tends to give inferior results. It is an advantage of the present process that many different inert organic solvents are suitable under the reaction conditions. For example, aromatic hydrocarbons and their halogenated derivatives are particularly effective as solvents. Among the great many of such aromatic solvents that are suitable may be mentioned trichlorobenzene, dichlorobenzene, monochloronaphthalene, dichlorotoluene, and napthalene; and any other such solvents which are liquid within the temperature range employed for the reaction and which do not appreciably volatilize within such range. Other aliphatic organic diluents are also suitable, such as kerosene fractions and chlorinated kerosene derivatives, although these aliphatic compounds are not preferred because of the lower solubility of the reactants therein.

The use of a solvent rather than a melt is preferred because of the greater operating facility afforded and the ease of control of temperature of the reaction. It is an advantage of the present process over the prior art methods of halogenating the preformed phthalocyanine, that many different solvents and diluents may be employed. In the halogenating processes, the vigorous conditions required for the production of highly halogenated phthalocyanines prevent the use of aromatic liquids which cannot withstand such conditions. Consequently, it has been necessary to resort to liquid halogenating agents or melts, such as aluminum chloride-sodium chloride melts.

The reaction of the process of the present invention may be carried on in any suitable manner and an appropriate reaction vessel which latter may be either open to the atmosphere or closed to develop autogenous pressure. The order of addition of the reacting materials is generally a matter of choice. The reactants are preferably introduced into the reacting medium in finely divided form to insure optimum rate of reaction. The solid ingredients may be previously ground and mixed, and then added to a suitable solvent or diluent, if such is employed. On the other hand, if urea or biuret is used as a flux, it may be melted and the other reacting materials added thereto. The reaction mixture is then heated and preferably agitation is effected in order to render the reaction mixture homogeneous. If oxidizing agents are employed in the reaction, the usual precautions should be observed.

An extremely wide range of temperatures for effecting the synthesis of the present invention is applicable. Color formation occurs at temperatures as low as about 150° C., but the reaction is unduly prolonged if the reaction mixture is held at such a low temperature. On the other hand, temperatures as high as 250° C. may be employed, but such temperatures tend to result in a product of lower pigmental strength and brilliance. In addition, the yield of phthalocyanine decreases at such higher temperatures due to side reactions and excessive decomposition of urea and biuret. It is generally preferable, therefore, for optimum results to carry out the reaction within a range of from about 165° C. to 185° C. The preferred range of temperature is from about 155° C. to 220° C. It is to be noted that when the free metal is used as the metal supplying agent and an oxidizing agent is used in conjunction therewith, the temperature range for color formation is reduced to below 200° C., whereas in the prior art with the free metal temperatures of over 230° C. are required.

The time period of heating during the reaction will vary with the temperature range employed. For example, at a temperature of 175° to 185° C., the reaction is completed usually in from one to three hours.

Although the reagents or reacting materials can be added in any manner, as above stated, in some instances it may be advantageous to utilize progressive synthesis by adding certain of the reactants followed by heating with subsequent addition of the remaining reactants. For example, tetrahalophthalic anhydride may be dissolved in trichlorobenzene. The urea and ancillary reagent, such as zirconium tetrachloride, added with subsequent heating; are then followed by addition of powdered copper metal and a suitable oxidizing agent.

Products

It is a distinguishing feature of the process of the present invention that mixed pigments comprising the stable metal polyhalophthalocyanines and the hydrated oxide of the metal of the ancillary reagent are obtained in all instances. These mixed pigments are primary products of the present invention, which products include these mixed pigments, and also the pure metallic symmetrically substituted polyhalophthalocyanines. In order to obtain pigments comprising the polyhalogenated phthalocyanines and the hydrated oxide of the ancillary reagent metal, it is necessary merely to filter the reaction product from the reaction medium and wash with suitable organic solvents and/or water to rid the products of any contaminating organic materials and soluble inorganic salts. Excellent quality green pigments of commercial value are obtained, particularly when zirconium or titanium halides or oxyhalides are used as the ancillary reagent for the process.

The relative proportions of metallic polyhalophthalocyanines to amphoteric metal hydrated oxide in the mixed pigments of the invention may be controlled by selecting the proper mol ratio of phthalocyanine-forming initial material to amphoteric metal halide or oxyhalide used as the ancillary reagent. The only limitation on the variation of such proportions is that the mol ratio of ancillary reagent, and therefore the hydrated oxide produced therefrom, to the metal phthalocyanine formed should not be appreciably less than one to one. With this exact mol ratio, for example, a mixed pigment of approximately 9% of the hydrated oxide of titanium and about 91% copper hexadecachlorophthalo-cyanine results. With the other amphoteric metals correspondingly higher percentages by weight of the hydrated oxides are present in the mixed pigment depending on the increasing molecular weight of the ancillary metals and the particular metal polyhalophthalocyanine synthesized.

The amount of hydrated oxide in the mixed pigment in percentage by weight of the total may be increased over the minimums set forth above merely by increasing the mol ratio of the ancillary reagent to the phthalocyanine-forming initial material.

The pure metallic phthalocyanine pigments may readily be isolated from the hydrated oxides of the ancillary reagent metal by a subsequent treatment, such as, for example, subjecting the mixed pigment to a dilute acid leach, or by any other suitable procedure, such as set forth below.

One advantage of the process is that the phthalocyanine pigments produced are in suitable physical condition so that the so-called "acid pasting" operation usually needed to obtain pigments of this type in the optimum physical condition is obviated. It may be added here that the acid pasting treatment is not only unnecessary, but when it is used in any of a number of modifications, in fact in every method yet tried, it gives a pigment 20-30% weaker than that obtained by the present process when tetrachlorophthalic anhydride is used as a starting material. When less completely halogenated starting materials are used, it is sometimes advantageous to use the "acid pasting" operation.

Another particular advantage of the process is the ease of purification of the product. In general, most of the solvent is removed by filtration. The remainder can be removed from the filter cake by washing it with a low boiling inexpensive solvent, or by subjecting the filter cake to steam distillation. The pigment may then be slurried with dilute sulfuric acid 10-30% strength. The product is washed acid free and dried. Usually 10-20% sulfuric acid is used, and it may conveniently be made by adding 95% sulfuric acid to the slurry obtained when steam distillation of the cake is employed, or it may be added before the steam distillation.

The usual method of obtaining phthalocyanine greens in suitable pigment form involves the dissolution thereof in twenty times or more their weight of sulfuric acid with recovery by subsequent dilution and precipitation. Many times more waste sulfuric acid results from this latter process.

Other methods of purifying the polyhalophthalocyanines will suggest themselves to one skilled in the art, for example, alternate extraction with an acid and a base. When removing titanium oxide, sulfuric acid of 30-80% strength is needed. The amphoteric oxides may also be removed in the form of their sodium salts, as sodium stannate, etc., by treatment with caustic but in general, the method using relatively dilute sulfuric acid, as suggested above, is preferable. The pigments formed in the process are generally 15-30% stronger than the usual phthalocyanine green pigments prepared by halogenation of the preformed phthalocyanines. This is particularly true when zirconium or titanium halides are used with tetrachlorophthalic anhydride, indicating that this product is in a more finely divided state and more suitable for use as a pigment.

Not only are the mixed pigments of the present invention novel products differing in their physical properties from mechanical mixtures of such pigments, but also the pure isolated metallic polyhalogenated phthalocyanines produced according to the process of the present invention are in themselves novel products having physical properties differing from polyhalogenated phthalocyanines produced by halogenation of the preformed phthalocyanine molecule. These differences in properties flow from the fact that the polyhalophthalocyanines of the present invention are symmetrically substituted molecules, whereas in the halogenation method of synthesizing polyhalophthalocyanines, the compounds resulting are of the unsymmetrically substituted type. Furthermore, these metallic phthalocyanines produced according to the present invention are of cleaner tone and higher strength in regard to their pigmental qualities than those produced by the prior art halogenation method, since in the employment of the latter method the pigmental values of the product are substantially deteriorated.

The invention is more fully described in the following examples, which are merely illustrative of various procedures utilizing the process of the present invention and are not intended to constitute a limitation thereof:

Example 1

Mix thoroughly, 100 parts powdered urea, 72 parts powdered tetrachlorophthalic anhydride, 4.5 parts 300 mesh copper powder, 17 parts zirconium tetrachloride and 2.25 parts powdered ammonium perchlorate. Add the mixture to 945 parts trichlorobenzene, and agitate it at room temperature for one hour. Heat the mixture to 100° and then from 100–165° during forty-five minutes at a uniform rate; hold the temperature at 165–175° for one hour and at 175–180° for one hour and a half. Filter the product while hot, wash it twice with 400 parts of hot trichlorobenzene each time, and then with 225 parts of isopropanol. Slurry the filter cake with 1000 parts of hot isopropanol, filter and wash the product again with 225 parts of isopropanol to remove the trichlorobenzene. Slurry the filter cake a second time with 1500 cc. water, heat the slurry to a boil and filter and wash with 1000 cc. water. Dry the product. A yield of 76 parts of a mixed pigment consisting of zirconium hydroxide and copper polychlorophthalocyanine is obtained.

This product was slightly stronger than a purchased phthalocyanine green when tested as follows: One part of pigment is mixed with two parts of #0 lithographic varnish and run over a laboratory roller mill six times. One part of the ink thus produced is mixed with 50 parts of a zinc oxide white ink to produce the tints. Both the inks are compared by drawing them down on paper, as are the tints. When compared in this manner, the product was a trace cleaner and 3% stronger than the purchased standard.

Thirty parts of the mixed pigment were added to 500 parts of water and run through a mill to disperse it. Then 87 parts of 66° Bé sulfuric acid are added and the mixture stirred at 60–70° C. for an hour and a half. Filter, wash the product with 200 cc. of 15% sulfuric acid, then wash it acid free and dry it. Twenty-five and a half parts of a very pure copper polychlorophthalocyanine are obtained. This is equivalent to 65 parts of copper polychlorophthalocyanine when the entire 76 parts produced above are used. The 65 parts of pure copper polychlorophthalocyanine are equivalent to 92% of amount theoretically possible. When compared to the same purchased full strength phthalocyanine green toner by the same means described above, it was 25% stronger and slightly cleaner.

Analysis of the product showed that it contained 49.64% chlorine and 5.43% copper, indicating that each molecule of copper polychlorophthalocyanine contained 16 atoms of chlorine, theoretical amounts being 50.3% chlorine and 5.64% copper for that compound.

Example 2

Add a well powdered mixture of 100 parts urea, 72 parts tetrachlorophthalic anhydride, and 23 parts anhydrous cupric chloride to 600 parts naphthalene. Heat the mixture to 85–90° C. and add 20 parts of titanium tetrachloride. Stir the mixture for an hour at 85–90° C. Heat it slowly to 177° C. Hold the temperature at 177–182° C. for two hours. Filter the product at about 150° C. Wash it with 1040 parts of hot dichlorobenzene, and then with 200 parts of hot alcohol. Slurry the filter cake with 200 parts of alcohol and heat it to a boil. Filter and wash the filter cake with 200 parts of alcohol. Wash the product free of soluble salts with hot water and dry it. A product containing about 15% of hydrated titanium dioxide and 85% of copper polychlorophthalocyanine is obtained. It may be used as it is, or freed from the hydrated titanium dioxide as follows: Grind the above product through a micromill with 600 parts of water. Add 400 parts of 66° Bé sulfuric acid and agitate the mixture at 60–65° C. for two hours. Filter and wash the precipitate with 200 parts of 40% sulfuric acid. Then wash the product acid free and dry it. A substantially pure copper polychlorophthalocyanine results.

The purified pigment was analysed and was found to contain 50.09% chlorine and 5.12% copper, indicating that the copper polychlorophthalocyanine contains sixteen atoms of chlorine.

Example 3

To 780 parts of ortho-dichlorobenzene and 157 parts trichlorobenzene, add a mixture of 100 parts urea, 85 parts of the ammonium salt of tetrachlorophthalic acid, 38 parts of cupric bromide, and 20 parts of zirconium tetrachloride. Agitate the mixture for two hours. Heat it to 175° C. slowly. Hold the temperature at 175–180° C. for two hours. Filter and wash the product as in Example 1. The resulting pigment mixture (84 parts) can be freed of zirconium oxide by treatment with dilute sulfuric acid of 10 to 80% concentration.

The method of treatment follows: Grind the dried, mixed pigment through a micromill with 1000 parts of water. Add to the suspension 200 parts of sulfuric acid. Heat the mixture to 50–60° C. for two hours. Filter and wash the product with 200 parts of 15% sulfuric acid solution (50–60° C.). Wash the product acid free and dry it. About 51 parts of an excellent quality of phthalocyanine green pigment is formed.

Analysis of the copper polychlorophthalocyanine gave 50.32% chlorine and 5.25% copper, showing that the product contained sixteen atoms of chlorine per molecule of phthalocyanine.

Example 4

To 197 parts of trichlorobenzene, add 25 parts of powdered urea, 18 parts of powdered tetrachlorophthalic anhydride, 1.25 parts of copper powder, 4.5 parts of zirconium tetrabromide and 3.0 parts of urea nitrate. Heat and work up the product as in Example 1. A mixture of copper polychlorophthalocyanine and zirconium hydroxide is obtained. The resulting pigment mixture may be used as it is, or freed from the zirconium hydroxide by treatment with dilute sulfuric acid of 10-80% concentration as in Example 3.

When freed of zirconium hydroxide, the product of this example was 16% stronger than a purchased full strength chlorinated copper phthalocyanine toner—though a slightly bluer. When analysed, our product was found to contain 49.7% chlorine, indicating that the compound contained between fifteen and sixteen chlorine atoms. No bromine was found. A yield of 13 parts or 75% of theory was obtained even though handling losses were quite high because of the small batch size. The purified product contained 4.28% copper.

Example 5

Grind and mix thoroughly 100 parts powdered urea, 72 parts powdered tetrachlorophthalic anhydride, 25 parts zirconium oxychloride, and 25 parts copper nitrate trihydrate. Add the mixture to 945 parts of trichlorobenzene. Heat the mixture as in Example 1. The resulting pigment mixture can be freed of zirconium hydroxide as in Example 3.

The yield of mixed pigment was 81 parts. After separation of the inorganic pigment, a yield of 58 parts of copper polychlorophthalocyanine was obtained. The copper polychlorophthalocyanine was found to contain 49.84% chlorine and 4.38% copper, showing that the product contained an average of nearly sixteen atoms of chlorine.

In the above example, 20 parts of zirconium tetrachloride may be used to replace the 25 parts of zirconium oxychloride.

Example 6

To 945 parts trichlorobenzene, add 100 parts powdered biuret, 72 parts powdered tetrachlorophthalic anhydride, 4.5 parts copper powder, 20 parts zirconium tetrachloride and 9 parts ground urea nitrate. Heat and work up the mixture as in Example 1. The product can be freed of zirconium hydroxide as in the above examples.

A yield of 66 parts of purified pigment is obtained, or 94% of theory. When compared as an ink with a purchased full strength phthalocyanine green toner, this product was slightly light in masstone. The tint was the same strength and close in shade to the purchased product. Upon analysis, the product of this example was found to contain 47.61% chlorine. This indicates between fourteen and fifteen atoms of chlorine in the product.

A mixture of biuret and urea can be used as well as either urea or biuret.

Example 7

Mix thoroughly 100 parts powdered urea, 83 parts powdered tetrachlorophthalic acid monoethyl ester, 14 parts powdered cupric oxide and 25 parts powdered zirconium tetrachloride. Add the above mixture to 715 parts monochloronaphthalene and agitate the mixture for three hours. Heat to 175° C. during one hour and hold the temperature at 175-180° C. for two hours. Filter and wash the product with hot monochloronaphthalene and wash it free of monochloronaphthalene with isopropanol. Then wash the cake free of soluble salts with hot water. A mixture of zirconium hydroxide and copper polychlorophthalocyanine is formed. This product may be freed of zirconium hydroxide as in Example 3.

A yield of 87 parts of copper polychlorophthalocyanine and zirconium hydroxide are obtained. Upon removal of the zirconium hydroxide a yield of 64 parts of pure copper polychlorophthalocyanine are obtained, equivalent to 94% of theory. This green pigment was analysed and contained 48.78% chlorine and 4.17% copper. Based on the chlorine content, this pigment contains more than fifteen atoms of chlorine per molecule of copper polychlorophthalocyanine.

Example 8

Add to 945 parts trichlorobenzene, 100 parts powdered urea, 72 parts powdered tetrachlorophthalimide, 5.5 parts cuprous oxide, 3.5 parts powdered sodium chlorate, and 20 parts powdered zirconium tetrachloride. Heat, filter and wash the product as in Example 7. A yield of 84 parts of a mixture of zirconium hydroxide and copper polychlorophthalocyanine is obtained. When the zirconium hydroxide is removed according to the procedure of Example 3, about 59 parts of copper polychlorophthalocyanine pigment is obtained. This is 84% of theory.

Upon analysis, the purified phthalocyanine was found to contain 50.22% chlorine and 5.39% copper. This analysis corresponds quite closely to the theoretically calculated amount for a copper polychlorophthalocyanine containing sixteen atoms of chlorine.

Example 9

To 945 parts trichlorobenzene, add 100 parts powdered urea, 76 parts tetrachlorophthalamide, 25 parts cupric phosphate trihydrate, 25 parts zirconium oxychloride, and 4.25 parts ammonium perchlorate. Heat the mixture slowly to 180° and hold at 180-185° C. for two hours. Filter and wash the product in the usual manner. A mixture (85 parts) of zirconium hydroxide and copper polychlorophthalocyanine is obtained. The resulting pigment mixture can be freed of zirconium hydroxide by treatment with 15% sulfuric acid in the usual manner to obtain 61 parts of copper polychlorophthalocyanine.

Example 10

To 157 parts trichlorobenzene, add 20 parts powdered urea, 14 parts tetrachlorophthalic anhydride, 1.0 part copper powder, 4.0 parts titanium tetrabromide, and 0.8 part ammonium perchlorate. Agitate the mixture for several hours. Heat and work up the product as in Example 1. A mixture of copper polychlorophthalocyanine and hydrated titanium dioxide is obtained. The resulting pigment mixture can be freed from hydrated titanium dioxide by treatment with dilute sulfuric acid of 30-80% concentration as in Example 2. A yield of eleven parts (80% of theory) of color was obtained.

*Example 11*

Mix thoroughly 100 parts powdered urea, 89 parts tetrachlorophthalic acid mono-ethyl ester, 4.5 parts copper powder, 20 parts zirconium tetrachloride, 4 parts ammonium perchlorate. Add the mixture to 945 parts trichlorobenzene. Agitate, heat and work up the mixture as in Example 3. A mixture of copper polychlorophthalocyanine and zirconium hydroxide is obtained. The resulting pigment mixture can be freed from zirconium hydroxide by treatment with dilute (15%) sulfuric acid in the usual manner.

A yield of 77 parts of copper polychlorophthalocyanine containing zirconium hydroxide is obtained. On removal of the zirconium hydroxide, 50 parts of copper polychlorophthalocyanine are obtained. The purified phthalocyanine contains 49.76% chlorine and 5.05% copper. This indicates very nearly 16 atoms of chlorine per molecule, the theoretical maximum (50.3% chlorine is the amount contained in pure copper polychlorophthalocyanine containing sixteen atoms of chlorine). The product of this experiment, freed of zirconium, was 15% stronger than purchased full strength copper polychlorophthalocyanine toner.

*Example 12*

Mix thoroughly, 100 parts powdered urea, 85 parts powdered tetrachlorophthalic acid ammonium salt, 4.5 parts copper powder, 5.0 parts potassium permanganate, and add the above mixture to 945 parts trichlorobenzene, then add 20 parts titanium tetrachloride. Agitate the mixture, heat it to 100° C., and then heat from 100–175° C. for one hour. Hold the temperature at 175° C. to 180° C. for two hours. Filter and wash the product with 300 parts of hot trichlorobenzene and wash it free of trichlorobenzene with hot alcohol. The product is then slurried with hot water, filtered and washed with hot water to remove soluble salts. A pigment consisting of copper polychlorophthalocyanine and hydrated titanium dioxide results on drying.

To remove the hydrated titanium dioxide, the wet cake is suspended in 500 parts of water and wet ground through an impact grinder. To the resulting slurry, add 250 parts of sulfuric acid and agitate the suspension at 50–60° C. for three hours. Filter and wash the product acid free. The resulting product is substantially pure copper polychlorophthalocyanine.

A yield of 58 parts of purified product is obtained, or 85% of theory. Analysis of the product gave 46.63% chlorine and 4.59% copper. On the basis of the analysis, the product contained about fourteen atoms of chlorine.

*Example 13*

To 945 parts of trichlorobenzene, add 100 parts powdered urea, 72 parts tetrachlorophthalic anhydride, 4.5 parts copper powder, 25 parts antimony trichloride, and 9 parts urea nitrate. The batch is stirred, heated and filtered as in Example 12, and then washed with trichlorobenzene, alcohol and hot water as usual. A pigment mixture of hydrated antimony oxide and copper polychlorophthalocyanine results. The hydrated antimony oxide can be removed from the pigment mixture as follows: 30 parts of a crude pigment are ground with 300 parts water and 110 parts of 40% sodium hydroxide added. The mixture is stirred for two hours at room temperature. It is filtered and washed with 100 parts of 10% sodium hydroxide and then washed alkaline free and dried.

A still better method of removing the hydrated antimony oxide is as follows: 30 parts of crude pigment mixture are stirred with 500 parts of water and 180 parts of hydrochloric acid added. The suspension is stirred for two hours at 50–60° C., filtered and washed acid free and dried. About 24 parts of a good quality copper polychlorophthalocyanine are formed.

Another run similiar to the above, but using 25 parts of antimony tribromide in place of the trichloride gives equally satisfactory results. This run gave a yield of 63 parts of purified phthalocyanine green, or 89% of theory. It was slightly dark in masstone and the tint was equal in shade and slightly weaker than a purchased phthalocyanine green standard. Analysis showed that it contained 46.46% chlorine and 5.48% copper. About fourteen atoms of chlorine per molecule are indicated by the analysis.

*Example 14*

To 630 parts of trichlorobenzene, add 50 parts of powdered urea, 58 parts of tetrabromophthalic anhydride, 2.25 parts copper powder, and 12 parts of zirconium oxychloride. Agitate the mixture and add 9 parts of nitromethane. Agitate, heat and work up the product as in Example 11. A pigment mixture of copper polybromophthalocyanine and zirconium hydrated oxide results on drying the product. The product may be separated from the zirconium oxide by the usual treatment with 15% sulfuric acid. The yield of mixed pigment was 46 parts, and 32 parts of pure copper polybromophthalocyanine were obtained from the mixture.

*Example 15*

Grind and mix well 72 parts tetrachlorophthalimide, 100 parts powdered urea, 4.5 parts powdered copper and 4 parts ammonium perchlorate. Add the mixture to 945 parts of trichlorobenzene and add 30 parts of tin tetrachloride. Agitate, heat and work up the product as in Example 12. The mixed pigment may be freed from tin oxide by one of the methods in Example 13, or by the usual method of treatment with sulfuric acid as in Example 3. The yield of mixed pigment was 79 parts.

Upon purification by the method of Example 3, 63 parts of copper polychlorophthalocyanine were obtained. The analysis of 45.64% chlorine and 4.35% copper in the product indicate that it contains about fourteen atoms of chlorine per molecule of copper polychlorophthalocyanine.

*Example 16*

(a) Mix thoroughly 100 parts of powdered urea, 54 parts of powdered tetrachlorophthalic anhydride, 29 parts of powdered tetrabromophthalic anhydride, 5.5 parts powdered copper, 20 parts of powdered zirconium tetrachloride, and 15.3 parts of urea nitrate. Add the mixture to 945 parts of trichlorobenzene. Heat, work up the mixture, and remove the zirconium hydroxide as in Example 1. An excellent yield of a copper chlorobromophthalocyanine is obtained.

In the above example the molecular proportion of tetrabromo- to tetrachlorophthalic anhydride is 1 to 3.

(b) Another run was made in which the procedure and quantities were identical except that the proportions of tetrachloro- and tetrabromophthalic anhydride were changed. In this run, 63 parts tetrachlorophthalic anhydride and 14 parts of tetrabromophthalic anhydride were used.

Both the above runs gave pigments of value. Before the separation of the zirconium hydroxide, the yields were (a) 80 parts and (b) 85 parts. After the separation of the zirconium hydroxide, the yields were (a) 58.5 parts, and (b) 65 parts of copper polyhalophthalocyanine. Both purified pigments were excellent in quality. The one containing the most bromine (a) was slightly more yellow in undertone and tint when a purchased full strength copper polychlorophthalocyanine toner. The product (b) was also stronger than the purchased toner. Both samples contained both chlorine and bromine, though the amount of chlorine was somewhat more and the amount of bromine somewhat less than that anticipated from the proportions of the anhydrides used. The analysis follows:

(a) 39.0% chlorine, 12.80% bromine, 4.83% copper
(b) 43.39% chlorine, 4.79% bromine, 5.08% copper Product (a) contains about two atoms of bromine and fourteen atoms of chlorine per molecule of copper polyhalophthalocyanine based on the above analysis, while in (b) the proportion is about one bromine to fifteen chlorine.

*Example 17*

To 945 parts of trichlorobenzene, add 100 parts of powdered urea, 72 parts of powdered tetrachlorophthalic anhydride, 4.5 parts of copper powder, and 2.5 parts of powdered ammonium perchlorate. Agitate the mixture, and add 13 parts of arsenic trichloride. Agitate the mixture for two hours at room temperature. Heat and work up the mixture as in Example 12. A yield of 78 parts of mixed pigment was obtained. Removal of the hydrated metal oxide gave 65 parts (94% of theory) of pure copper polychlorophthalocyanine pigment. Analysis of the pure pigment gave 49.65% chlorine and 4.17% copper, indicating that the copper polychlorophthalocyanine contains between fifteen and sixteen atoms of chlorine.

*Example 18*

Mix thoroughly, 100 parts of powdered urea, 72 parts of tetrachlorophthalic anhydride, 4.5 parts copper powder, and 18 parts of zirconium tetrachloride. Add the mixture to 945 parts of trichlorobenzene, and then add 18 parts of nitrobenzene. The mixture was agitated at room temperature for 2 hours. It was then heated and worked up as in Example 12.

The product was a green pigment and the yield was 80 parts. It was freed of zirconium hydroxide by treatment with 15% sulfuric acid in the usual manner. A yield of 62 parts of purified pigment was obtained. Upon analysis, the purified pigment was found to contain 50.47% chlorine and 5.45% copper, corresponding very closely to the amounts theoretically expected for the analysis of a copper polychlorophthalocyanine containing sixteen atoms of chlorine. The product of this example was a pigment that was more than 10% stronger than a purchased full strength chlorinated phthalocyanine when compared in the usual manner as an ink and tint.

*Example 19*

Mix thoroughly 50 parts powdered urea, 58 parts tetrabromophthalic anhydride, and 19 parts of cupric bromide. Add the mixture to 630 parts trichlorobenzene, and then add 20 parts of tin tetrabromide. Agitate and heat the mixture as in Example 7. A yield of 65 parts crude pigment is obtained. It may be freed of tin hydroxide as in Example 3. The resulting product is a copper polybromophthalocyanine. When compared with copper polychlorophthalocyanine as an ink, the copper polybromophthalocyanine is much weaker and yellower. Upon purification, 36 parts of copper polybromophthalocyanine were obtained.

*Example 20*

To 945 parts trichlorobenzene, add 100 parts powdered urea, 80 parts powdered tetrachlorophthalic acid monomethyl ester, 7 parts powdered cuprous cyanide and 30 parts powdered zirconium tetrachloride. Agitate and heat the mixture as in Example 7. Filter and wash the product as in Example 7. About 81 parts of a mixed pigment containing about 30% zirconium hydroxide and 70% copper polychlorophthalocyanine are formed. This product may be freed of zirconium hydroxide as in Example 3.

When the product was freed of zirconium hydroxide, it was 10% stronger than a purchased, full strength phthalocyanine green toner, when compared in the usual manner. A yield equivalent to 60 parts of purified toner was obtained, or a yield of pure toner of 88% of theory. This product was found to contain 46.93% chlorine and 5.53% copper. Based on the chlorine analysis, the compound contained between fourteen and fifteen atoms of chlorine.

*Example 21*

A mixture of 100 parts powdered urea, 72 parts tetrachlorophthalic anhydride, 7 parts cuprous cyanide, 15 parts zirconium tetrachloride and 4 parts ammonium nitrate are added to 945 parts trichlorobenzene. The mixture is heated and worked up as in the previous example, and a similar product results. The original product, however, contains somewhat less zirconium hydroxide because of the smaller quantity of zirconium tetrachloride used.

When the product of the above example was freed of zirconium hydroxide by treatment with acid as in Example 3, a yield of 56 parts (82% of theory) of purified toner was obtained. This product was slightly weaker than a purchased full strength toner. Upon analysis, it was found to contain 46.98% chlorine and 5.85% copper. The analysis shows that the copper polychlorophthalocyanine contains between fourteen and fifteen chlorine atoms.

*Example 22*

Mix thoroughly, 100 parts powdered urea, 80 parts powdered tetrachlorophthalic acid monomethyl ester, 12 parts cupric sulfate anhydrous, and 20 parts zirconium tetrachloride. Add the mixture to 945 parts trichlorobenzene. Agitate and heat the mixture as in Example 12. Filter the product and wash it as in Example 12. After the resulting pigment is boiled with 1000 parts of water, filtered and washed to remove soluble salts, a mixture of zirconium hydrated oxide and copper polychlorophthalocyanine is obtained. A yield of 80 parts mixed zirconium hydroxide and copper polychlorophthalocyanine was obtained. Upon purification, the yield of purified pigment was 58 parts. Analysis of the purified pigment gave 50.31% chlorine and 4.94% copper, showing that the product was a copper polychlorophthalocyanine containing sixteen atoms of chlorine.

Example 23

To 650 parts dichlorobenzene and 157 parts trichlorobenzene, add 100 parts powdered urea, 72 parts of powdered tetrachlorophthalimide, 4.5 parts copper powder and 15 parts ammonium persulfate, powdered. Agitate the mixture and add 20 parts titanium tetrachloride. Heat and work up the product as in the previous example. The pigment mixture containing a hydrated oxide of titanium, and copper polychlorophthalocyanine may be freed of the hydrated titanium oxide as in Example 2.

The yield of mixed pigments was 80 parts, and from the mixed pigments, 66 parts of copper polychlorophthalocyanine were obtained. The product was analysed and found to contain 46.58% chlorine and 3.79% copper, indicating that the copper polychlorophthalocyanine contained about fourteen atoms of chlorine.

Example 24

Mix well 100 parts powdered biuret, 80 parts tetrachlorophthalic acid monomethyl ester, powdered, 4.5 parts copper powder, 25 parts zirconium oxychloride, and 10 parts of powdered potassium bromate. Add the above mixture to 945 parts of trichlorobenzene. Heat and work up the mixture as in Example 22. The resulting pigment mixture of copper polychlorophthalocyanine and zirconium hydroxide can be freed from the zirconium hydroxide by the methods of Example 3. Analysis of the purified product gave 50.32% chlorine and 3.81% copper. The chlorine analysis indicated that the product was a copper polychlorophthalocyanine containing sixteen atoms of chlorine.

Example 25

To 945 parts of trichlorobenzene, add 100 parts powdered urea, 72 parts tetrachlorophthalimide, and 7 parts of powdered cuprous chloride. Agitate the mixture and add 30 parts stannic chloride. Heat the mixture slowly to 185° C., and hold the temperature at 185-190° C. for two hours. Filter and wash the product free of trichlorobenzene and alcohol as usual. Then slurry it with hot water and filter and wash with hot water to remove the soluble salts. A mixture (76 parts) of tin oxide and copper polychlorophthalocyanine is formed. It may be freed of tin oxide as in Example 3 to isolate the copper polychlorophthalocyanine.

The yield of purified pigment was 56 parts. The purified pigment was analysed and was found to contain 49.02% chlorine and 5.08% copper, indicating that the copper polychlorophthalocyanine contains between fifteen and sixteen atoms of chlorine.

Example 26

One hundred parts of powdered urea are added to 945 parts of trichlorobenzene, and then 7 parts of 70% nitric acid are added drop by drop. The mixture is stirred for twenty minutes. A mixture of 72 parts powdered tetrachlorophthalic anhydride, 4.5 parts copper powder and 18 parts of powdered zirconium tetrachloride are then added. The reaction mass is agitated for two hours, and then heated and worked up as in Example 12. A yield of 84 parts of mixed pigment (zirconium hydroxide and copper polychlorophthalocyanine) were obtained.

When freed from zirconium hydroxide in the usual manner, with 15% sulfuric acid, the yield of purified pigment was 59 parts. The purified pigment was somewhat stronger than a purchased full strength chlorinated phthalocyanine green toner when tested in the usual manner. Analysis of the purified pigment gave 49.9% chlorine and 5.64% copper, showing that the copper polychlorophthalocyanine contained sixteen atoms of chlorine per molecule.

Example 27

To 3148 parts of trichlorobenzene, add 300 parts powdered urea, 216 parts tetrachlorophthalic anhydride, 13.5 parts finely powdered copper, 60 parts powdered zirconium tetrachloride, and 27 parts powdered urea nitrate. Agitate the mixture a few hours. Heat to 100° C., and then from 100-178° C. during one hour. Hold the temperature at 178-182° C. for two hours. Cool the product to 150° C. and filter it. Wash the cake with 500 parts hot trichlorobenzene. Weigh the entire filter cake. Take one quarter of the filter cake and boil it with 500 parts alcohol. Filter and wash with 300 parts alcohol. Wash the product free of soluble salts with hot water and then dry it. A yield of 54 parts of a mixed pigment containing about 20% zirconium hydroxide and 80% copper polychlorophthalocyanine is obtained.

The remaining three quarters may be converted to pure copper polychlorophthalocyanine as follows: Add the remaining three quarters of the filter cake to 1000 parts of water and 230 parts of 66° Bé. sulfuric acid, and steam distill to remove the trichlorobenzene. Filter the product remaining in the distillation flask while it is still hot and wash the copper polychlorophthalocyanine until it is free of acid. Dry the product. About 141 parts of an extremely strong and pure polychlorophthalocyanine are obtained. When the product was tested in the usual manner by the preparation of an ink from the pigment, the product was found to be 10% stronger than a purchased full strength phthalocyanine green toner.

The mixture of zirconium hydroxide and copper polychlorophthalocyanine produced from the first one-quarter of the run was only 10% weaker than the same purchased standard.

The purified product was analysed and found to contain 47.58% chlorine and 4.95% copper, showing that it contained at least fourteen or fifteen atoms of chlorine per molecule of copper polychlorophthalocyanine.

Example 28

To 750 parts of dichlorotoluene, add a mixture of 100 parts powdered urea, 72 parts powdered tetrachlorophthalic anhydride, 4.5 parts copper powder, and 4.0 parts ammonium perchlorate. Agitate the mixture and add, dropwise, 25 parts of antimony pentachloride. Heat and work up the mixture as in Example 1. A mixture (79 parts) of hydrated antimony oxide and copper polychlorophthalocyanine is formed. Upon removal of the hydrated antimony oxide by the method of Example 3, 66.0 parts of copper polychlorophthalocyanine were obtained. Analysis of the product gave 47.08% chlorine and 3.48% copper. Based on the chlorine content, each molecule of copper polychlorophthalocyanine contained between 14 and 15 atoms of copper.

Example 29

Mix thoroughly 100 parts powdered urea, 63 parts powdered trichlorophthalic anhydride, 5.5 parts copper powder, 20 parts powdered zirconium tetrachloride, and 10.0 parts powdered ammonium nitrate. Add the mixture to 945 parts of trichlorobenzene. Heat, work up and remove the zirconium hydroxide as in Example 1. An excellent yield of highly chlorinated copper phthalocyanine containing about twelve atoms of chlorine results. The shade of this product is much less green than that formed from the tetrachlorophthalic anhydride.

When 96 parts of tribromophthalic anhydride and 20 parts more of urea are used in the above example, a good yield of highly brominated copper phthalocyanine containing about twelve atoms of bromine results.

Example 30

Mix thoroughly 100 parts powdered urea, 72 parts powdered tetrachlorophthalic anhydride, 20 parts zirconium tetrachloride, and 25 parts of powdered nickel nitrate crystals (6.H₂O). Add the mixture to 945 parts of trichlorobenzene. Heat, work up the product as in Example 1, removing the zirconium hydroxide. An excellent yield of nickel chlorophthalocyanine containing about 16 chlorine atoms is obtained.

Example 31

Use of other metals. The preparation of copper and nickel polyhalophthalocyanines has been illustrated above. A general procedure for the preparation of metal polyhalophthalocyanines follows: Mix thoroughly 100 parts of powdered urea, 72 parts of powdered tetrachlorophthalic anhydride, 9.8 parts of cadmium powder (99% through a 300 mesh screen), 20 parts of powdered zirconium tetrachloride, and 4.25 parts ammonium perchlorate. Add the mixture to 945 parts of trichlorobenzene. Heat the mixture, and work it up as in Example 1. Remove the zirconium hydroxide as in Example 1. A good yield of highly chlorinated cadmium phthalocyanine is obtained.

In place of the 9.8 parts of cadmium, when 5.0 parts of powdered cobalt, or 5.0 parts of powdered nickel, or 9.8 parts of powdered tin, or 10.5 parts of powdered antimony, or 18.0 parts of powdered lead, or 3.0 parts of powdered aluminum, or 4.6 parts of powdered chromium were employed, the corresponding metal polyhalophthalocyanine were obtained.

In most of the above examples, oxidizing agents have been used. In every case, the reaction will go without the oxidizing agent, but we prefer to use it. However, there are some cases, as in Examples 2, 3, 5 and 7, where excellent results are obtained when no oxidizing agent is used. In most cases, when the oxidizing agent is omitted, the resulting pigment is dirtier in hue than it would be had the oxidizing agent been used.

The manner of heating and the way of mixing the reactants in making polyhalophthalocyanines by this process may, of course, vary. The above examples illustrate acceptable techniques, but are not to be construed as limitations.

When working with powerful oxidizing agents and organic compounds, care must be taken to avoid explosions; however, none of the above procedures have ever caused an explosion, even though several hundred variables have been tried.

I claim:

1. A process for the production of a mixed pigment consisting essentially of a hydrated metal oxide and a polyhalophthalocyanine having more than 8 halogen atoms per molecule substituted in the aryl nuclei thereof, which comprises reacting in an inert solvent, a phthalocyanine forming material, a nitrogen supplying material, a metallic ion supplying material and an ancillary agent, said phthalocyanine forming material being selected from the group consisting of the nuclear halogen substituted phthalic acids, the anhydrides, ammonium salts, imides, amides and mono alkyl esters of such acids, and the nuclear halogen substituted orthocyano benzamides, the halogen substituents of the aryl nucleus of said phthalocyanine forming material selected from the group consisting of chlorine atoms and bromine atoms, said nitrogen supplying substance being selected from the group consisting of urea and biuret, said ancillary agent being selected from the group consisting of the halides and oxyhalides of zirconium, titanium, tin, arsenic and antimony and forming in the course of the reaction the hydrated oxide component of the mixed pigment said metallic ion supplying material being selected from the group consisting of metallic copper, nickel, tin, chromium, cadmium, cobalt, antimony, molybdenum and lead and the salts and oxides of said metals.

2. A process for the production of a mixed pigment consisting essentially of a hydrated metal oxide and a polyhalophthalocyanine having more than 8 halogen atoms per molecule substituted in the aryl nuclei thereof, which comprises reacting in an inert solvent, an oxidizing agent, a phthalocyanine forming material, a nitrogen supplying material, a metallic ion supplying material and an ancillary agent, said phthalocyanine forming material being selected from the group consisting of the nuclear halogen substituted phthalic acids, the anhydrides, ammonium salts, imides, amides and mono alkyl esters of such acids, and the nuclear halogen substituted orthocyano benzamides, the halogen substituents of the aryl nucleus of said phthalocyanine forming material being selected from the group consisting of chlorine atoms and bromine atoms, said nitrogen supplying substance being selected from a group consisting of urea and biuret, said ancillary agent being selected from the group consisting of the halides and oxyhalides of zirconium, titanium, tin, arsenic and antimony and forming in the course of the reaction the hydrated oxide component of the mixed pigment said metallic ion supplying material being selected from the group consisting of metallic copper, nickel, tin, chromium, cadmium, cobalt, antimony, molybdenum and lead and the salts and oxides of said metals.

3. The process of claim 2 wherein the ancillary agent is employed in an amount equal to from about 4% to about 15% by weight of the total quantity of reacting materials.

4. The process of claim 2 effected at a temperature of from about 150° C. to about 220° C.

5. The process of claim 2 wherein the phthalocyanine forming material has 3 halogen atoms as substituents in the aryl nucleus thereof.

6. The process of claim 2 wherein the metallic ion supplying substance is a copper ion supplying agent.

7. The process of claim 2 wherein the metallic ion supplying substance is a copper ion supplying agent and the phthalocyanine forming material has 3 halogen atoms as substituents in the aryl nucleus thereof.

8. The process of claim 2 wherein the phthalocyanine forming material has 4 halogen atoms as substituents in the aryl nucleus thereof.

9. The process of claim 8 wherein the metallic ion supplying substance is a copper ion supplying agent.

10. The process for the production of polyhalogenated phthalocyanine having more than 8 halogen atoms as substituents in the aryl nuclei thereof, which comprises reacting in the presence of an inert solvent a phthalocyanine forming material, a nitrogen supplying material, a metallic ion supplying material and an ancillary agent, and recovering the polyhalogenated phthalocyanine so formed from the reaction mixture, by selective dissolution of the hydrated amphoteric metal oxides present said phthalocyanine forming material being selected from the group consisting of the nuclear halogen substituted phthalic acids, the anhydrides, ammonium salts, imides, amides and mono alkyl esters of such acids, and the nuclear halogen substituted orthocyano benzamides, the halogen substituents of the aryl nucleus of said phthalocyanine forming material selected from the group consisting of chlorine atoms and bromine atoms, said nitrogen supplying substance being selected from the group consisting of urea and biuret, said ancillary agent being selected from the group consisting of the halides and oxyhalides of zirconium, titanium, tin, arsenic and antimony said metallic ion supplying material being selected from the group consisting of metallic copper, nickel, tin, chromium, cadmium, cobalt, antimony, molybdenum and lead and the salts and oxides of said metals.

11. The process for the production of polyhalogenated phthalocyanine having more than 8 halogen atoms as substituents in the aryl nuclei thereof, which comprises reacting in the presence of an inert solvent a phthalocyanine forming material, a nitrogen supplying material, a metallic ion supplying material, an oxidizing agent and an ancillary agent, and recovering the polyhalogenated phthalocyanine so formed from the reaction mixture, by selective dissolution of the hydrated amphoteric metal oxides present, said phthalocyanine forming material being selected from the group consisting of the nuclear halogen substituted phthalic acids, the anhydrides, ammonium salts, imides, amides and mono alkyl esters of such acids, and the nuclear halogen substituted orthocyano benzamides, the halogen substituents of the aryl nucleus of said phthalocyanine forming material selected from the group consisting of chlorine atoms and bromine atoms, said nitrogen supplying substance being selected from the group consisting of urea and biuret, said ancillary agent being selected from the group consisting of the halides and oxyhalides of zirconium, titanium, tin, arsenic and antimony said metallic ion supplying material being selected from the group consisting of metallic copper, nickel, tin, chromium, cadmium, cobalt, antimony, molybdenum and lead and the salts and oxides of said metals.

12. The process of claim 11 wherein the ancillary agent is employed in an amount equal to from about 4% to about 15% by weight of the total quantity of reacting materials.

13. The process of claim 11 wherein the metallic ion supplying agent is a copper ion supplying agent.

14. The process of claim 11 wherein the phthalocyanine forming material has 3 halogen atoms as substituents in the aryl nucleus thereof.

15. The process of claim 11 wherein the phthalocyanine forming material has 4 halogen atoms as substituents in the aryl nucleus thereof.

16. The process of claim 11 wherein the polyhalogenated phthalocyanine is recovered by dissolving the hydrated amphoteric metal oxides present in sulphuric acid of from 10% to 80% strength.

17. The process for the production of polyhalogenated phthalocyanine which comprises reacting in the presence of an inert solvent a phthalocyanine forming material, a nitrogen supplying material, a metallic ion supplying material, an oxidizing agent and an ancillary agent, and recovering the polyhalogenated phthalocyanine so formed from the reaction mixture, said phthalocyanine forming material having from two to four halogen atoms substituted in the aryl nucleus thereof and being selected from the group consisting of the phthalic acids, the anhydrides, ammonium salts, imides, amides and mono alkyl esters of such acids, and the orthocyano benzamides, the halogen substituents of the aryl nucleus of said phthalocyanine forming material selected from the group consisting of chlorine atoms and bromine atoms, said nitrogen supplying substance being selected from the group consisting of urea and biuret, said ancillary agent being selected from the group consisting of the halides and oxyhalides of zirconium, titanium, tin, arsenic and antimony said metallic ion supplying material being selected from the group consisting of metallic copper, nickel, tin, chromium, cadmium, cobalt, antimony, molybdenum and lead and the salts and oxides of said metals.

18. A process for preparing copper hexadecachlorophthalocyanine by heating tetrachlorophthalic anhydride, urea, copper powder, an oxidizing agent and an ancillary agent selected from the group consisting of halides and oxyhalides of zirconium, titanium, tin, arsenic and antimony, in an inert solvent at 150–220° C. until pigment formation is complete.

FRANK H. MOSER.

REFERENCES CITED

The following references are of record in the file of this patent:

UNITED STATES PATENTS

| Number | Name | Date |
|---|---|---|
| 2,197,459 | Wyler | Apr. 16, 1940 |
| 2,214,477 | Riley | Sept. 10, 1940 |
| 2,253,560 | Detrick et al. | Aug. 26, 1941 |
| 2,276,860 | Niemann et al. | Mar. 17, 1942 |
| 2,460,783 | Lecher et al. | Feb. 1, 1949 |

FOREIGN PATENTS

| Number | Country | Date |
|---|---|---|
| 476,243 | Great Britain | Dec. 6, 1937 |